United States Patent
Hsieh et al.

(10) Patent No.: US 7,865,953 B1
(45) Date of Patent: Jan. 4, 2011

(54) METHODS AND ARRANGEMENT FOR ACTIVE MALICIOUS WEB PAGES DISCOVERY

(75) Inventors: Sheng-chi Hsieh, Taipei (TW); Tse-Min Chen, Taipei (TW); Yi-Yun Tseng, Taipei (TW)

(73) Assignee: Trend Micro Inc., Tokyo (JP)

( * ) Notice: Subject to any disclaimer, the term of this patent is extended or adjusted under 35 U.S.C. 154(b) by 887 days.

(21) Appl. No.: 11/756,572

(22) Filed: May 31, 2007

(51) Int. Cl.
*G06F 17/30* (2006.01)
*G06F 11/00* (2006.01)

(52) U.S. Cl. .............................. 726/22; 726/25; 726/4

(58) Field of Classification Search .................. 726/22, 726/25, 4
See application file for complete search history.

(56) References Cited

PUBLICATIONS

Moshchuk (A Crawler-based Study of Spyware on the. Web, in Proceedings of the 2006 Network and Distributed. System Security Symposium, pp. 17-33, Feb. 2006).*

Pollution in P2P file sharing systems; Liang, J.; Kumar, R.; Xi, Y.; Ross, K.W.; INFOCOM 2005. 24th Annual Joint Conference of the IEEE Computer and Communications Societies. Proceedings IEEE vol. 2; Publication Year: 2005 , pp. 1174-1185 vol. 2.*
Private Information Protection System with Web-Crawler; Myung Sil Choi; Hyun Woo Kim; Yong Hwan Kim; Kyung Ho Chung; Kwang Seon Ahn; Networking and Communications, 2008. WIMOB '08. IEEE International Conference on Wireless and Mobile Computing, Publication Year: 2008 , pp. 672-677.*
Web Site Management System through Private Information Extraction Myung Sil Choi; Yong Soo Park; Kwang Seon Ahn; Advanced Information Networking and Applications Workshops, 2009. WAINA '09. International Conference on Publication Year: 2009 , pp. 37-42.*

* cited by examiner

*Primary Examiner*—David Y Jung
(74) *Attorney, Agent, or Firm*—IP Strategy Group, P.C.

(57) ABSTRACT

An arrangement for performing active malicious web page discovery is provided. The arrangement includes a web monitor module, which is configured to monitor a plurality of potential suspicious unified resource locators (URLs). The arrangement also includes a crawler module, which is configured to download the plurality of potential suspicious URLs. The arrangement further includes a malicious page identifier (MPI), which is configured to verify a set of risk statuses for the plurality of potential suspicious URLs.

20 Claims, 8 Drawing Sheets

METHODS AND ARRANGEMENT FOR ACTIVE MALICIOUS WEB PAGES DISCOVERY

BACKGROUND OF THE INVENTION

The usage of the internet has proliferated as millions of users employed the internet as a medium of communication and a source of information. Due to the far-reaching capability and popularity of the internet, the interact has also been manipulated to become a tool for spreading malicious code to attack computer systems of unsuspecting victims. Once the malicious code have successfully infiltrated a computer system, the malicious code can cause far-reaching damages (e.g., delete files, rewrite the registry, rewrite the disk space, etc.) that may not be limited to the individual computer system but may also spread to other computers that may be on the same network. Thus, individuals and enterprises are usually looking for a solution that may minimize the possibility of an attack because the task of removing the malicious code and/or addressing the problems caused by the malicious code can quickly become expensive in term of time and resources.

A popular method by which malicious code may be spread is to embed the code onto a web page. When a user accesses a web page, the malicious code may be downloaded onto the user's computer system. In recent years, a plurality of suspicious web page clearinghouse web sites (e.g., phishtank.com, stopbadware.org, etc) has been created to solicit user's help in identifying potential suspicious URLs. Many companies that provide anti-virus application programs may access the plurality of suspicious web page clearinghouse web sites to retrieve the potential suspicious URLs in the task of identifying new virus patterns to update the anti-virus application programs.

The task of identifying the true risk status of a potential suspicious web page is usually manually performed by one or more engineers of companies that develop anti-virus application programs. As discussed herein, a risk status refers to the status of a web page. Risk status may include, but are not limited to, safe, suspicious, and malicious.

Figure 1:
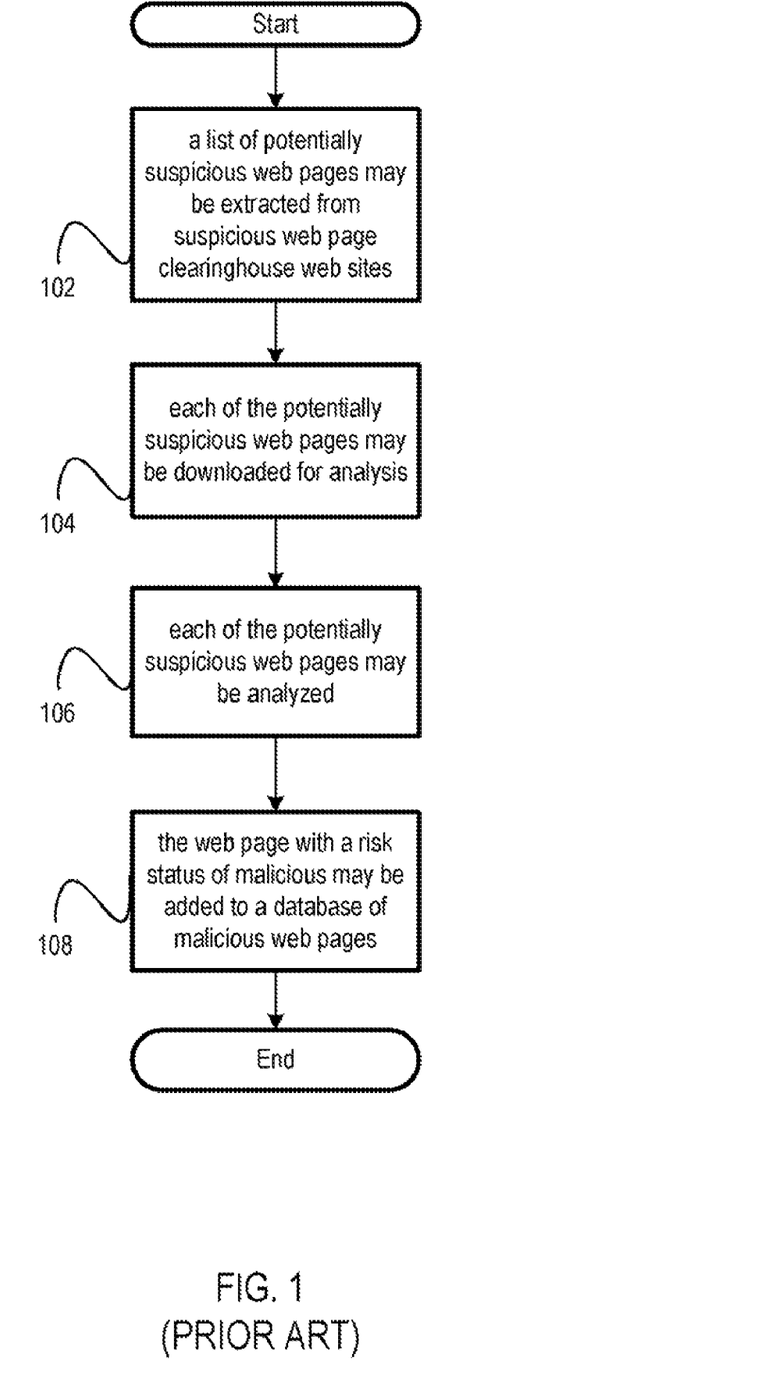
FIG. 1 shows a simple flow chart illustrating the process for identifying the risk status for a potential suspicious web page.

To facilitate discussion, FIG. 1 shows a simple flow chart illustrating the process for identifying the risk status for a potential suspicious web page.

At a first step 102, a list of potential suspicious web URLs may be extracted from a plurality of suspicions web page clearinghouse web sites. The task of extracting the list is usually manually performed by an engineer.

At a next step 104, each of the potential suspicious URLs may be downloaded for analysis.

At a next step 106, each of the potential suspicious URLs may be analyzed. In an example, the web content of each of the potential suspicious URLs may be scanned by an anti-virus program to determine the risk status of the web page. Note, that most anti-virus application programs may only be able to identify known threats. Thus, most anti-virus application programs may only be able to identify a web page as having a risk status of safe or malicious. Since, most anti-virus application programs are unable to identify unknown threats, most anti-virus application program is unable to identify whether or not a web page has a risk status of suspicious. Although some anti-virus application programs has been able to identify script that may look suspicious. Once a web page has been identified as a web page with suspicious script, the engineer may have to perform further analysis to determine whether or not a web page is suspicious.

At a next step 108, the web page with a risk status of malicious may be added to a database of malicious web pages. If the web page is identified as safe and/or may have suspicious script, the web page is not added to the database. In an example, until the engineer has a chance to analyze the suspicious script, the web page is usually unaccounted for in the database.

The aforementioned method as described in FIG. 1 is dependent upon an engineer's schedule. In other words, whether or not a potential suspicious URL is timely analyzed is dependent upon the time and resources that may be available to analyze the web content associated with the potential suspicious URL. Thus, if the engineer is not able to timely analyze the web page, the web page may have expired and be unavailable for analysis by the time the engineer has sufficient time to perform the analysis. As a result, the database is not updated with the potential suspicious web page. For expired web pages with suspicious script, the engineer may have lost the opportunity to update the anti-virus program with new virus patterns.

Due to the sheer volume of potential suspicious URLs that may be listed on the suspicious web page clearinghouse web sites, the engineers may not be able to analyze each of the potential suspicious URLs that are listed on the plurality of suspicious web page clearinghouse web sites. In an example, on one suspicious web page clearinghouse web sites, an average of a few thousands potential suspicious URLs are submitted daily. Given the time required to analyze each potentially suspicious web page, most companies that develop anti-virus application programs may not have sufficient resources to perform analysis on all of the potential suspicious URLs. Further, the cost of hiring additional engineers to enable such a possibility may be uneconomical. As a result, not all of the potential suspicious URLs are adequately analyzed. Further, many of the links on the potential suspicious URLs are left unchecked because the engineers just do not have the capacity to broaden the scope of the analysis.

Since most companies that develop anti-virus application programs may have limited resources, each company's resources may be dedicated to reviewing potential suspicious URLs instead of cleaning out the database that may be storing the malicious web pages. Over time, the site of the database of malicious web pages may grow as more malicious web pages are added to the database. The database may quickly become bloated as new malicious web pages are added to the database but expired web pages are not removed. Since the task of maintaining the database is usually a manual process, the task of cleaning the database may not be given priority. As a result, the database of malicious web pages may continue to grow, thereby requiring additional memory space in order to store the ever-growing number of malicious web pages.

BRIEF SUMMARY OF THE INVENTION

The invention relates, in an embodiment to an arrangement for performing active malicious web page discovery. The arrangement includes a web monitor module, which is configured to monitor a plurality of potential suspicious unified resource locators (URLs). The arrangement also includes a crawler module, which is configured to download the plurality of potential suspicious URLs. The arrangement further includes a malicious page identifier (MPI), which is configured to verify a set of risk statuses for the plurality of potential suspicious URLs.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention ma also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In one aspect of the invention, the inventors herein realized that many malicious URLs are being left unchecked because human is not efficient and effective in monitoring each and every URLs that are active on the internet. Even though suspicious web pages clearinghouse web sites are helpful in identifying some of the potential suspicious URLs, the clearinghouse web sites are usually dependent upon users to update the list of potential suspicious URLs. Thus, even though thousands of potential suspicious URLs are identified on a daily basis, thousands of additional malicious web pages may still be left unidentified.

Also, the inventors herein realized that even for those web pages that are identified as potentially suspicious on the clearinghouse web sites, many potential suspicious URLs are left unanalyzed due to the limited resources and time that companies that develops anti-virus application programs may have dedicated to the task. As aforementioned, the task of analyzing potentially suspicions web may usually required human intervention. However, given the limited human bandwidth that a company may dedicate to the task, many potential suspicious URLs may have expired before a human may even have the chance to analyze the web page. As a result, the database that stores malicious web pages may be incomplete. Thus, the scan engine for detecting virus and/or malicious web pages may not be updated with all the new virus patterns, thereby being less effective in the task of protecting a user's computer.

The inventors herein realized that an automatic detection system is needed in order to filter through the millions of web pages on the internet in order to identify potential suspicious URLs. Once the potential suspicious URLs have been identified, a substantially automatic process with minimal human intervention may be implemented to download and analyze the web pages.

In accordance with embodiments of the invention, an active malicious web page monitoring system is provided in which a web monitor module, a crawler module, and a malicious page identifier (MPI) are provided. Embodiments of the invention also include methods for monitoring, downloading and verifying a potential suspicious web page.

In an embodiment of the invention, a web monitor module is provided to perform the monitoring process. The web monitor module may include a URL database that may store the URLs that may need to be monitored, in an embodiment. Besides the URLs, the URL database may also store the attributes about the URLs, in an embodiment. Examples of attributes may include, but are not limited to, time-stamp of current version of content related to URL, risk status of URL, and the likes.

The web monitor module may also include a monitoring process component, which may include intelligence for managing the interaction between the crawler module and the MPI, in an embodiment. In an embodiment, the monitoring process component may identify the web pages that may need to be downloaded by the crawler module. In another embodiment, the monitoring process component may identify the web pages that may need to be analyzed by the MPI.

In an embodiment of the invention, a crawler module is provided to perform the downloading process. The crawler module may receive the download request from either the web monitor module or from the MPI. Upon receiving the request, the crawler module may employ a spider to crawl the internet to download the content of the web page from a remote host. The web page downloaded from the internet may be stored in a page database. In an embodiment, the crawler module may also include a proxy for handling download requests from the MPI.

In an embodiment of the invention, an MPI is provided to perform the verification process. The MPI may include a scan engine used to detect the known threats and identify the web page as having a risk status of safe or malicious. In an embodiment of the invention, unknown threats may also be identified by the scan engine and may be forwarded to an unknown threat detector. In an example, the scan engine may identify a web page with script as a suspicious web page and may pass the web page to the unknown threat detector for analysis.

In an embodiment, the unknown threat detector may be a virtual machine with a browser and a watcher application program. The browser may be configured to run the suspicious web page and the watcher application program may be configured to identify unusual activities (e.g., downloading activities, writing to the registry, writing to the disk, and the likes). In an embodiment, if the suspicious web page includes links, the browser may interact with the proxy of the crawler module to request for the content of the suspicious links to be downloaded.

Over time, the URL database may grow as more web pages are added due to the monitoring, downloading and verification processes as aforementioned. To prevent the URL database from becoming unnecessarily bloated due to expired web pages and/or due to web pages that may have a risk status of safe and have not been updated over a period of time, a maintenance process may be implemented, in an embodiment. During the maintenance process, a web page may be removed for various reasons, including, but are not limited to, the web page has been removed, the web page can not be downloaded, and the web page has a safe status and has not been updated recently. In an embodiment, a pre-defined time interval may be set to define when a safe web page may be removed from the URL database.

The features and advantages of the present invention may be better understood with reference to the figures and discussions that follow.

Figure 2:
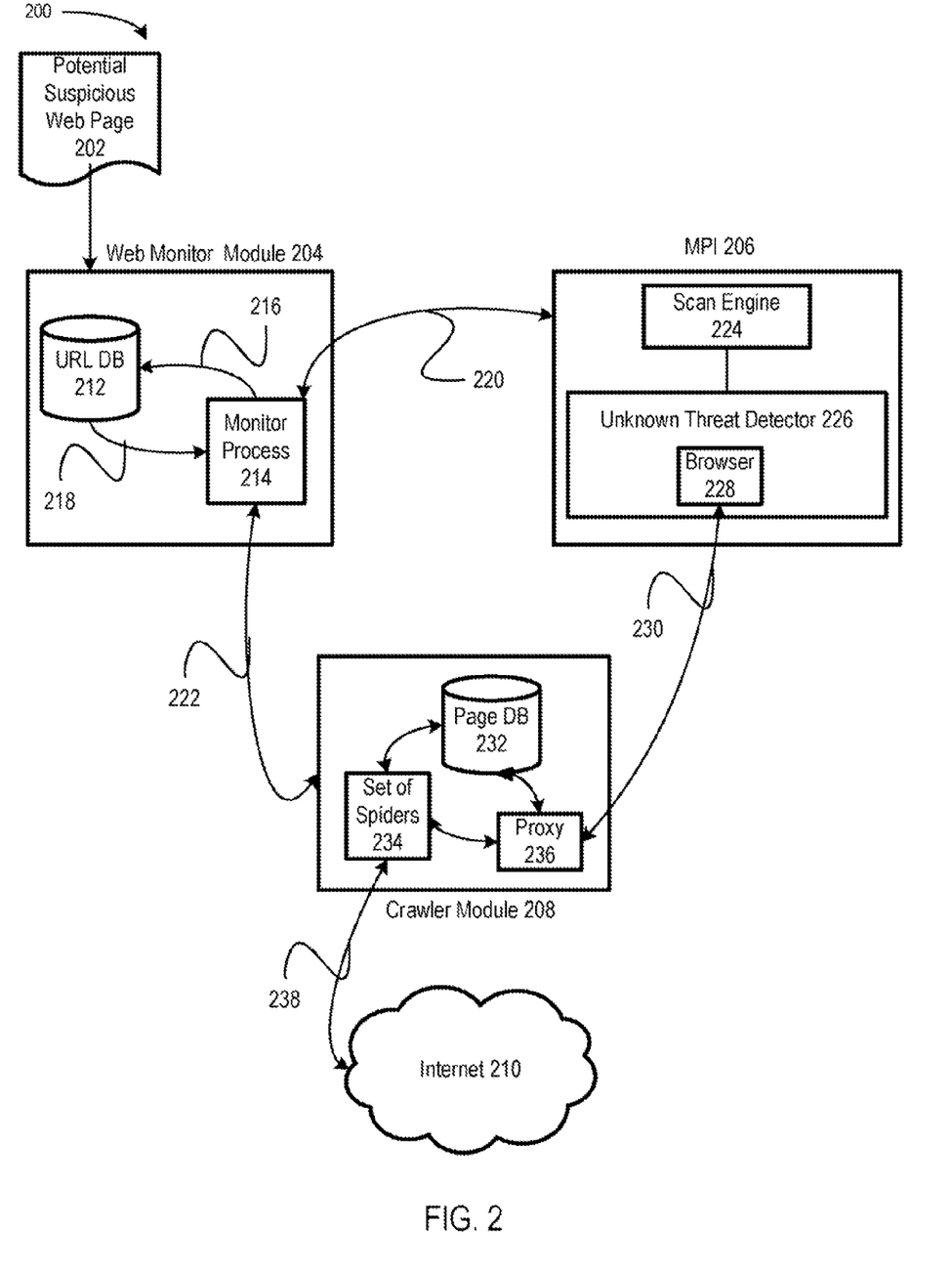
FIG. 2 shows in an embodiment of the invention, an architectural overview of an active malicious web page system 200.

FIG. 2 shows in an embodiment of the invention, an architectural overview of an active malicious web page system 200.

Active malicious web page system 200 may include a web monitor module 204, a crawler module 208, and a malicious page identifier (MPI) 206. In an embodiment, web monitor module 204 may be configured to include the intelligence for determining what unified resource locator (URL) may be potentially suspicious and may need to be analyzed. In another embodiment of the invention, crawler module 208 may be configured to download the web pages associated with the URLs. In yet another embodiment of the invention, MPI 200 may be configured to perform analysis on the web pages to determine the risk status of each of the web pages. Unlike the prior art, the monitoring process, the downloading process, and the verification process performed by web monitor module 204, crawler module 208, and MPI 206, respectively, may be performed automatically with limited or 110 human intervention.

In an embodiment of the invention, web monitor module 204 may include a URL database 212 and a monitor process component 214. In an embodiment, URL database may store the URLs of the potential suspicious URLs, malicious web pages, and safe web pages that may be associated with malicious web pages, and the likes.

In an embodiment, monitor process component 214 may be configured to interact with a crawler module 208 via a path 222 to retrieve the most recent version of the web pages stored in URL database 212 and/or potential suspicious URLs. In another embodiment, monitor process component may also be configured to interact with a malicious page identified (MPI) 206 via a path 220 in order to determine the risk status of the web pages.

In an embodiment of the invention, crawler module 208 may include a pane database 232, a set of spiders 234, and a proxy 236. In an embodiment, page database 232 may be configured to store downloaded web pages crawled by set of spiders 234.

In an embodiment, set of spiders 234 may be configured to crawl internet 210 (e.g., internet) via, a path 238 to download web pages from a set of remote hosts. Set of spiders 234 may search pane database 232 prior to crawling internet 210. In an embodiment, if the web page has not yet been crawled, set of spiders 234 may crawl interact 210 via a path 238 to download the web page from a remote host. In another embodiment, if the web page has recently been updated and page database 232 has not been updated with the latest version, set of spiders 234 may send the download request to the remote host to retrieve the latest version.

In an embodiment, proxy 236 may be configured to interact with MPI 206 via a path 230. Proxy 236 may receive a request from MPI 206 to download a link (e.g., auto-download links, such as script links, iframe links, image links, and the likes). Similar to set of spiders 234, proxy 236 may consult with page database 232 prior to accessing internet 210 to download the web page associated with the requested link from a remote host. If the web page associated with the requested link has not yet been downloaded and stored in page database 236, proxy 236 may employ set of spiders 234 to crawl internet 210 to download the requested web page from the remote host.

In an embodiment of the invention, MPI 206 may include a scan engine 224 and an unknown threat detector 226. Scan engine 224 may be configured to identify the risk status of a web page by identifying known threats (e.g., viruses, malicious codes, etc.). Scan engine 224 may also be configured to identify suspicious web page (i.e., web page with unknown threat). In an example, scan engine 224 may identify web pages with suspicious script as a suspicious web page.

In an embodiment, unknown threat detector 226 may be configured to handle and analyze suspicious web pages. In an embodiment, unknown threat detector 226 may be a virtual machine with a browser 228, which may be configured to interact with proxy 236 to retrieve a download a web page that may be a link on the suspicious web page. In an example, a suspicious web page may include ten links. Browser 228 may send a request to proxy 236 to download the web panes associated with the ten links. In an embodiment, browser 228 may only send auto-download links (e.g., script links, iframe links, image links, etc.) to proxy 236. In an embodiment, links that require user's interaction may not be sent to proxy 236 since unknown threat detector 226 is being implemented without human intervention. Browser 228 with a watcher application program may be employed to run each of the downloaded links to identify unapproved activities (e.g., downloading data from the internet, writing to memory, writing to the register, and the likes). As discussed herein, a watcher application program is an application program designed to detect unusual activities (e.g., writing to memory space, writing to registry, etc.).

Figure 3:
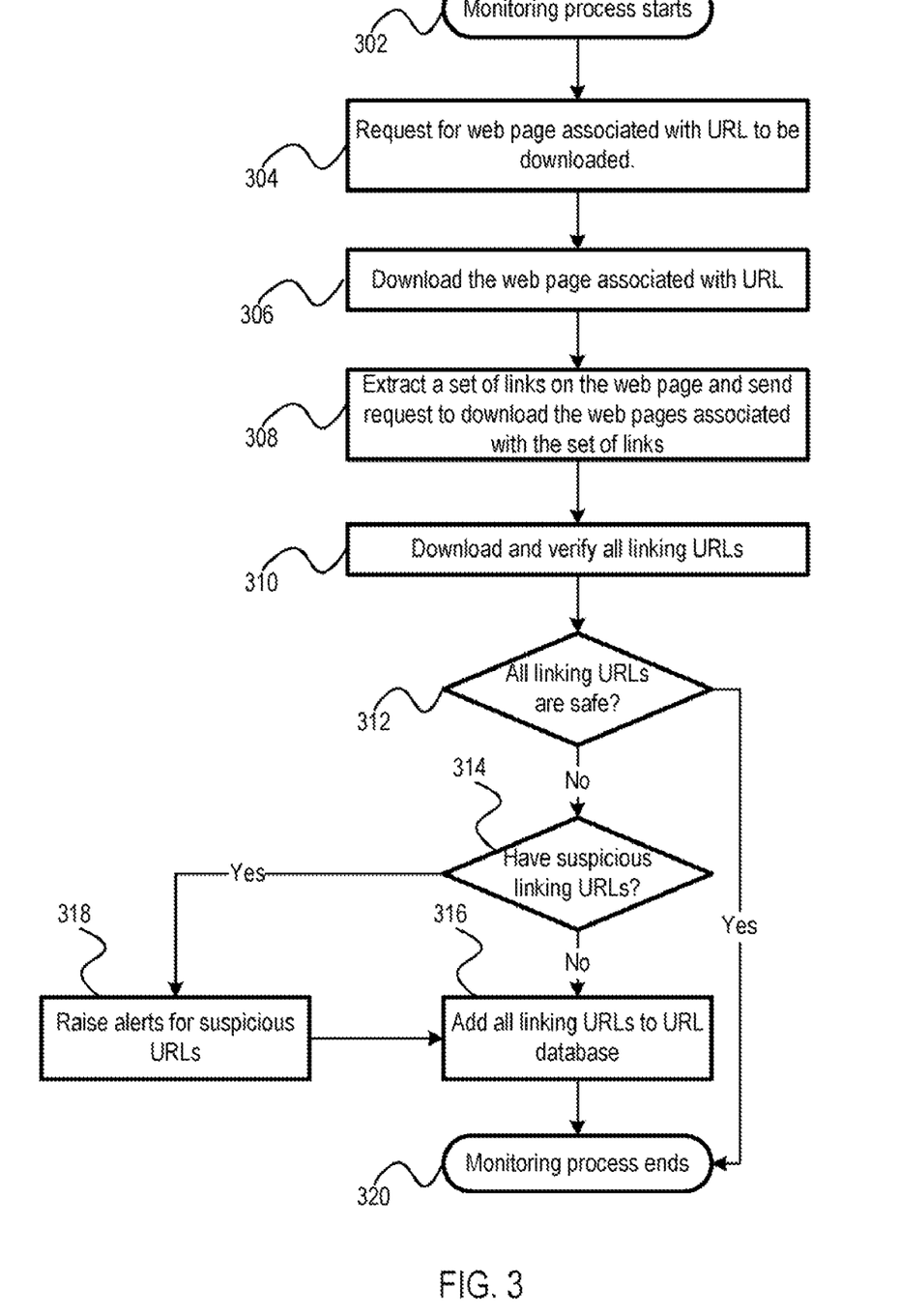
FIG. 3 shows, in an embodiment of the invention, a simple flowchart illustrating the monitoring process performed by a web monitor.
Figure 4:
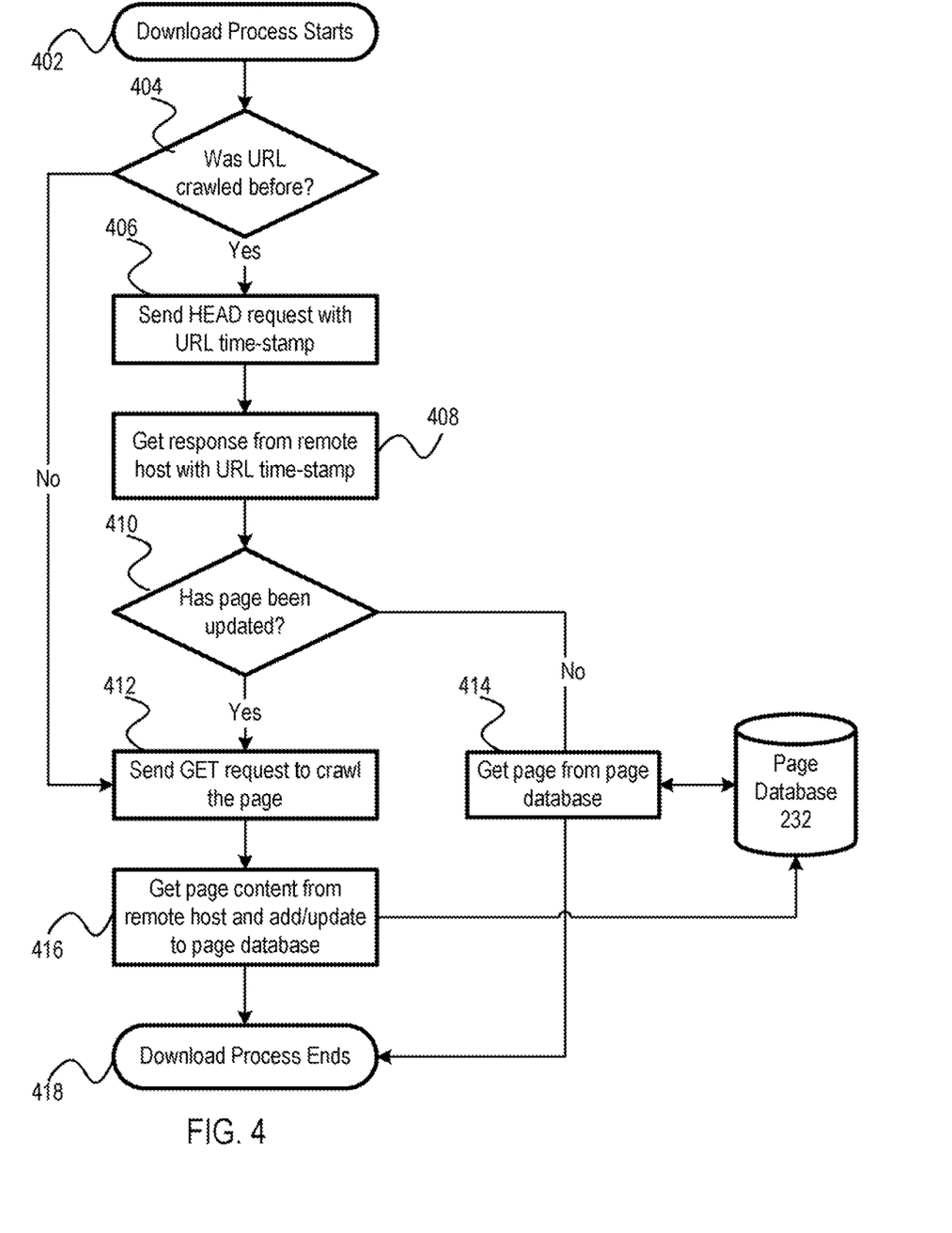
FIG. 4 shows, in an embodiment of the invention, a simple flowchart illustrating a downloading process.
Figure 5:
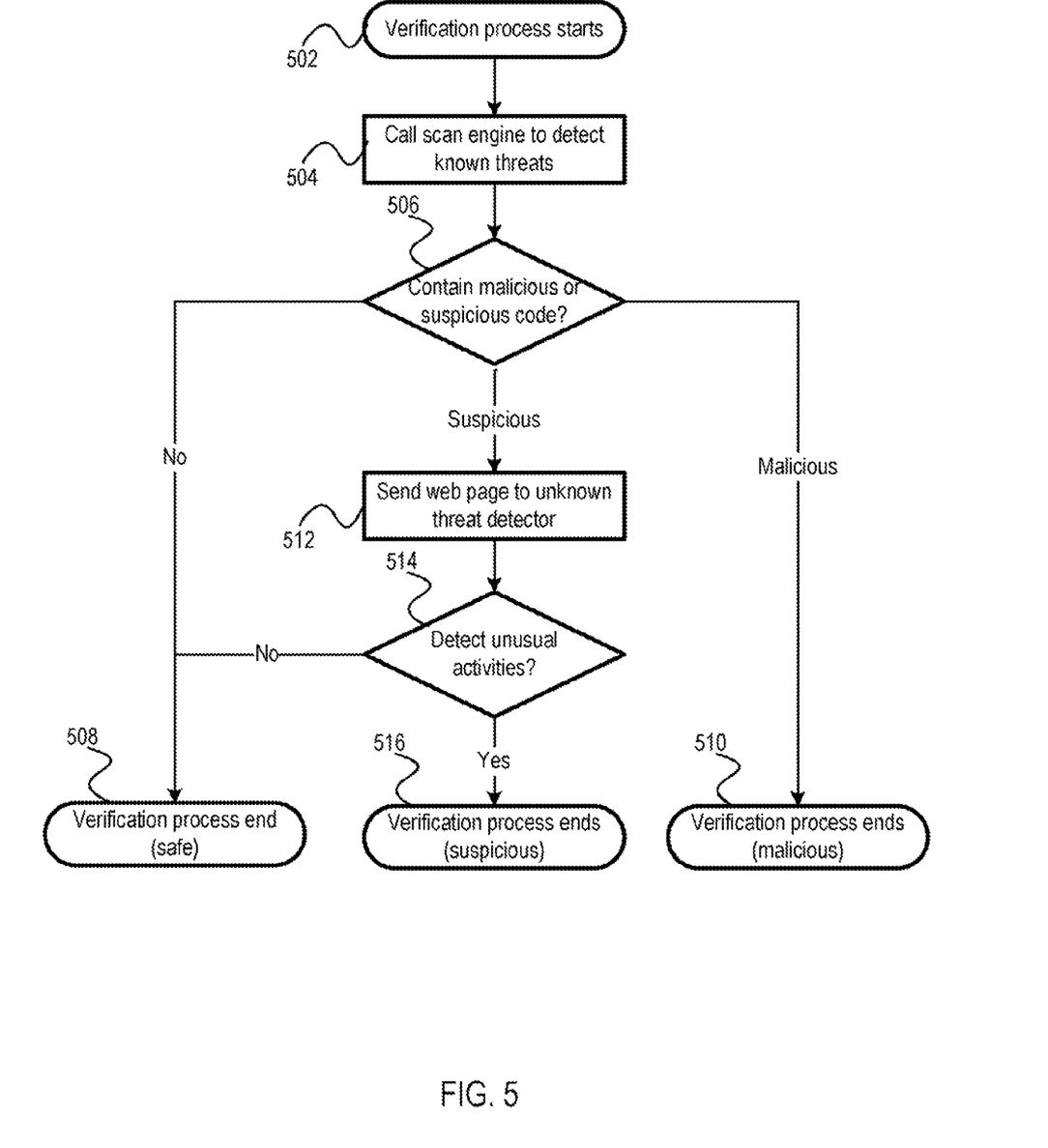
FIG. 5 shows, in an embodiment of the invention, a simple flowchart illustrating a verification process.

To illustrate how each of the modules within active malicious web page system 200 may interact with one another to perform active malicious web page discovery, FIG. 3, 4, and 5 may be employed to show the steps for performing the monitoring process, the downloading process, and the verification process.

FIG. 3 shows, in an embodiment of the invention, a simple flowchart illustrating the monitoring process performed by a web monitor.

At a first step 302, the monitoring process may begin. In an embodiment of the invention, the monitoring process may be configured to be performed daily and/or at a preset time period. In an embodiment, a list of potential suspicious web page may be gathered from different sources, including but not limited to suspicious web page clearinghouse web site, customers' feedbacks, and the likes. In an example, web monitor module 204 may extract a list of potential suspicious URLs from a suspicious web page clearinghouse web site (e.g., phishtank) and save the list of potential suspicious URLs in URL database 212. In an embodiment, the extracting step may be automated, thereby not requiring human intervention (e.g., engineer).

In an embodiment, each URL within URL database 212 may be refreshed. In an example, both the URLs recently downloaded from suspicious web page clearinghouse web sites and the URLs previously crawled may be refreshed. A monitor process component 214 may extract (along paths 216 and 218) the URLs from URL database 212 and begin analyzing each potential suspicious URL. Consider the situation wherein, for example, a potential suspicious URL 202 is being analyzed by monitor process component 214.

At a next step 304, a request to download a web page may be sent to crawler module 208. In an example, monitor process component 214 may send a request via path 222 to crawler module 208 to download a first web page associated with potential suspicious URL 202. Unlike the prior art, the process of downloading a web page may no longer requires human intervention.

At a next step 306, crawler module 208 may download the requested first web page. Crawler module 208 may employ set of spiders 234 to download the content of the first web page associated with potential suspicious URL 202. Before accessing remote host through internet 210 to download the requested first we page, set of spiders 234 may search page database 232 to determine if the first web page associated with potential suspicious URL 202 has been crawled yet. If the first web page has not been crawled, then set of spiders 234 may download the first web page from interact 210. Refer to FIG. 4 for more details about the downloading process. Once the first web page has been downloaded, crawler module 208 may notify and send the web content of the first web page back to monitor process component 214.

At a next step 308, monitor process component 214 may parse and analyze the downloaded content of the first web page to extract a first set of links. In an embodiment, monitor process component 214 may include intelligence for determining the type of links that may need to be sent to crawler 208. In an example, links that may have been recently verified by MPI 206 may be excluded. By including an intelligence to determine which web pages may have already been analyzed, monitor process component 214 may reduce the amount of redundant work that crawler 208 may have to perform.

At a next step 310, upon receiving the first set of links, crawler module 208 may employ set of spiders 234 to download the requested first set of web pages associated with the first set of links. Again, before accessing internet 210 to download the requested first set of web pages, set of spiders 234 may search page database 232 to determine if the requested first set of web pages have been crawled yet. For those web pages from the first set of web pages that have not yet been crawled, then set of spiders 234 may crawled internet 210 to download the web pages. After downloading the first set of web pages associated with the first set of links, crawler module 208 may notify and send the web content associated with the first set of web pages back to monitor process component 214.

In an embodiment, web monitor module 204 may include intelligence for parsing the web content to determine which web pages may need to be analyzed by MPI 206. In an example, before sending the web contents associated with potential suspicious URL 202 and the first set of links to MPI 206, monitor process component 214 may access URL database 212 to determine if any of the web pages have already been verified by MPI 206. If one or more web pages have already been verified during the current monitoring cycle, monitor process component 214 may not forward the verified web pages to MPI 206. By including an intelligence to determine which web pages may have to be monitored, monitor process component 214 may reduce the amount of redundant work that MPI 206 may have to perform.

If one or more web pages have not been recently verified, monitor process component 214 may send a request for verification to MPI 206. MPI 206 may employ scan engine 224 and unknown threat detector 226 to determine the risk status of the web pages. Refer to FIG. 5 for more details about the verification process.

After the verification process has been completed, MPI 206 may send the risk status for each of the web pages back to web monitor module 204. At a next step 312, if all of the set of web pages associated with potential suspicious URL 202 has a risk status of safe, then the set of web pages associated with potential suspicious URL 202 is not stored in URL database 212 and the monitoring process for potential suspicious URL 202 may end at a next step 320.

However, if one or more of the set of web pages associated with potential suspicious URL does not have a risk status of safe, then at a next step 314, web monitor module 204 may check to see if the risk status is suspicious. If at least one of the web page of the set of web pages has a risk status is not suspicious, such as malicious, then the entire set of web pages associated with potential suspicious URL 202 may be added to URL database 212. At a next step 316, the monitoring process may end at step 320.

However, if a web page has been identified as suspicious, then at a next step 318, web monitor module 204 may raise an alert, such as send a message to an engineer indicating that a web page has been identified as suspicious and that further analysis may be required. Given the limited bandwidth an engineer may have for performing analysis, the engineer may now concentrate on analyzing web pages with unknown threat instead of spending his limited bandwidth on analyzing web pages that may be easily handled by scan engine 224. After sending the alert, web monitor module 204 may add all the web pages associated with potential suspicious URL 212 to URL database 212.

FIG. 4 shows, in an embodiment of the invention, a simple flowchart illustrating a downloading process. Consider the situation wherein, for example, monitor process component 214 has sent a download request to crawler module 208.

At a first step 402, the download process may begin. In an embodiment, crawler module 208 may employ set of spiders 234 to perform the downloading process. In an example, crawler module 208 may employ spider 234 to download the first web page associated with potential suspicious URL 202.

At a next step 404, set of spiders 234 may check page database 232 to determine if the requested URL has already been crawled. In other words, before downloading the first web page associated with potential suspicious URL 202 from a remote host, spider 234 may check page database 232 to determine whether or not requested potential suspicious URL 202 has been crawled. Note that if the downloading request if coming from browser 228 instead of monitoring process module 214, then proxy 236 may be employed to consult page database 232 instead of set of spiders 234.

If requested potential suspicious URL 202 has not yet been crawled, then at a next step 412, set of spiders 234 may send a GET request to the remote host. In other words, set of spiders 234 may crawl internet 210 to download the content of the requested URL from the remote host.

At a next step 416, the content of potential suspicious URL 202 may be downloaded and saved in page database 232.

At a next step 418, the download process may end and crawler module 208 may send a notification and the content of the URL back to monitoring process component 214.

Referring back to step 404, if requested potential suspicious URL 202 has already been crawled, set of spiders 234 may sent a HEAD request to a remote host via internet 210. As discussed herein, a HEAD request refers to a request in which header information (e.g., partial information about a web site) about a URL is requested. In an embodiment, header information may include a URL timestamp, which is the last time the content of the web page has been modified.

At a next step 408, the remote host may send back the header information with the URL timestamp.

At a next step 410, set of spiders 234 may compare the newly downloaded URL timestamp against the timestamp stored in page database 232 for the requested URL.

If the newly downloaded URL timestamp is the same as the stored timestamp, then at a next step 414, then crawler module 208 may send a notification to monitoring process component 214 via path 222.

However, if the newly downloaded URL timestamp is greater than the stored timestamp, then at step 412, set of spiders 234 may send a GET request to crawl the web page associated with the requested URL. Similar to above, internet 210 may return the content of the requested URL at step 416 and the content of the first web page is updated in page database 214.

FIG. 5 shows, in an embodiment of the invention, a simple flowchart illustrating a verification process.

At a first step 502, the verification process may begin. Consider the situation wherein, for example, web monitor module 204 may request MPI 206 to determine the risk status of web page A.

At a next step 504, MPI 206 may employ scan engine 224 to detect any known threats.

At a next step 506, scan engine 224 may scan web page A to determine if web page A has malicious and/or suspicious codes.

If scan engine 224 identifies web page A as being free of malicious and/or suspicious code (i.e., has a risk status of safe), then at a next step 508, web page A is marked with a risk status of safe and the verification process may end.

If scan engine 224 identifies web page A as including malicious codes, then at a next step 510, web page A is marked with a risk status of malicious and the verification process may end.

If scan engine 224 identifies web page A as including suspicious code (e.g., script), then at a next step 512, web page A may be forwarded to unknown threat detector 226.

At a next step 514, unknown threat detector 226 may determine if unusual activities are occurring on web page A. To make this determination, unknown threat detector 226 may employ browser 228 to run web page A and a watcher application program to determine if unusual activities are being conducted while web page A is being accessed. In an example, while web page A is being accessed, a script on web page A may be writing to the registry of the user's computer.

In an embodiment, if web page A includes a second set of links (such link b, link c, and link d), then browser 228 may interact with proxy 236 within crawler module 208 to retrieve the second set of web pages associated with the second set of links. The method for downloading is as described in FIG. 4 with a few exceptions. In an example, the download request is initially handled by proxy 236 instead of set of spiders 234. For example, proxy 236 may receive the request from browser 228 and may consult page database 232 to determine whether or not the second set of web pages has already been crawled. If the web page of the set of web pages has already been crawled, proxy 236 may passed the web page back to browser 228 via path 230. However, if the web page has not been crawled and/or if the web page has been updated, then proxy 236 may send the download request to a set of spiders 234 to crawl the internet to download the requested web page.

Once the second set of well pages associated with the second set of links (i.e., link b, link c, and link d) has been retrieved by browser 228, browser 228 may run web page A. The watcher application program may be employed to determine if unusual activities (e.g., downloading, register information being changed, display being changed, writing to memory, etc.) are being performed while web page A is being accessed. If unusual activities are being conducted, then web page A is marked with a risk status of suspicious. However, if no unusual activities are identified, then web page A is marked with a risk status of safe.

Consider the situation wherein, for example, link c is associated with an executable script. While web page A is being accessed by browser 228, the script associated with link c may try to write to the registry. In this example, since unusual activities are being conducted by link c, web page A is marked with a risk status of suspicious.

In contrast to the prior art, human intervention is not required in the verification process until a web page is marked with a risk status of suspicious. Thus, the limited resources that a company may have can be dedicated to analyzing web pages with unknown threats. In addition, even if the limited resources prevent timely analysis of a web page by a human, the verification process enables the web page to be identified and the content saved so that the content is available for a more detail analysis to be performed at a later time.

The steps shown in FIGS. 3, 4, and 5 illustrate a simple method for automating monitoring, downloading, and verification processes. By implementing these processes, not only do these processes minimizes human intervention but may also allow for potential suspicious URLs to be analyzed in a timely manner. Thus, even if an engineer may have limited bandwidth for performing analysis, the potential suspicious URLs as listed on the suspicious web page clearinghouse websites may be analyzed and the risk statuses identified so that URL database 212 may be updated in a timely manner.

In addition, the monitoring, downloading, and verification processes may enable the scope of the web pages being monitored to be broadened since the monitoring process may also analyze links that may be associated with the potential suspicious URLs. Consider the situation wherein, for example, a potential suspicious URL, which has been extracted from one of the clearinghouse web sites, has been added to the URL database. Once the web content associated with the potential suspicious URL has been added, the web monitor may identified two hyperlinks, URL b and URL c. If MPI identifies URL b is as malicious and URL c as safe, both hyperlinks may be added to the URL database for continual monitoring. The next time URL c is analyzed, a link (URL d) may have been added to the web page. MPI may analyze URL d and may assign a risk status of malicious. In this example, URL b, URL c, and URL d are not listed on the clearinghouse web sites. However, since the automated active malicious web page discovery system may be able to broaden its monitoring capability, links associated with monitored URLs may be discovered and analyzed.

Figure 6:
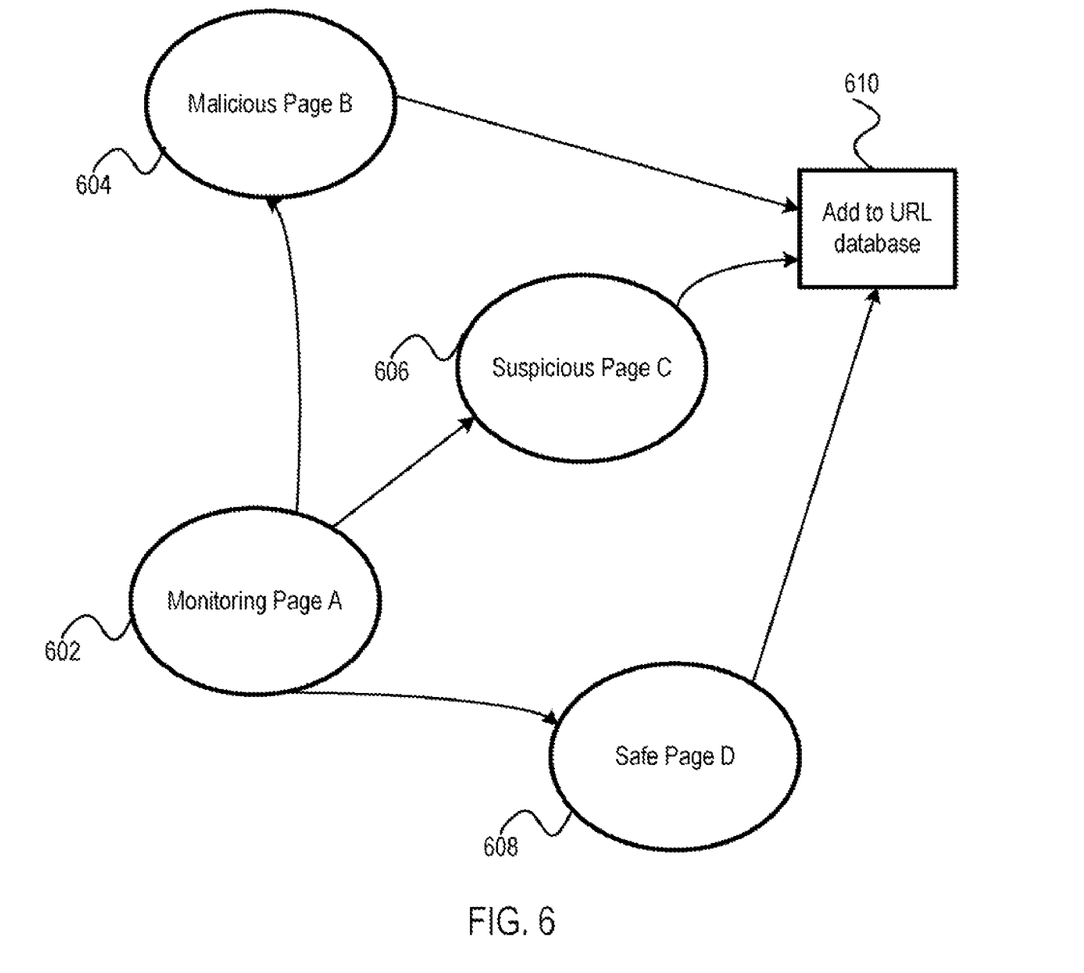
FIG. 6 shows, in an embodiment of the invention, a simple block diagram illustrating how a web monitor module may handle a family of web pages.

FIG. 6 shows, in an embodiment of the invention, a simple block diagram illustrating how a web monitor module may handle a family of web pages. As discussed herein, a family of web pages is a potential suspicious URL and the related links. Consider the situation wherein, for example, a potential suspicious URL, such as monitoring page A 602 may include three links (web page B, web page C, and web page D). After the verification process, web page B may have a risk status of malicious (shown as malicious page B 604), web page C may have a suspicious status (shown as suspicious page C 606), and web page D may have a safe status (shown as safe page D 608). In an embodiment, if one member of a family of web pages has a risk status that is not safe, then the entire family of web pages may be added to the URL database. In this example, monitoring page A 602, malicious page B 604, suspicious page C 606, and safe page D 608 may be added to the URL database. Even though safe page D 608 may have a risk status of safe, the likelihood of safe page D 608 being link to a non-safe web page is higher than a sate web page that may belong to a family of web pages in which all web pages have a risk status of safe, such as that shown in FIG. 7.

Figure 7:
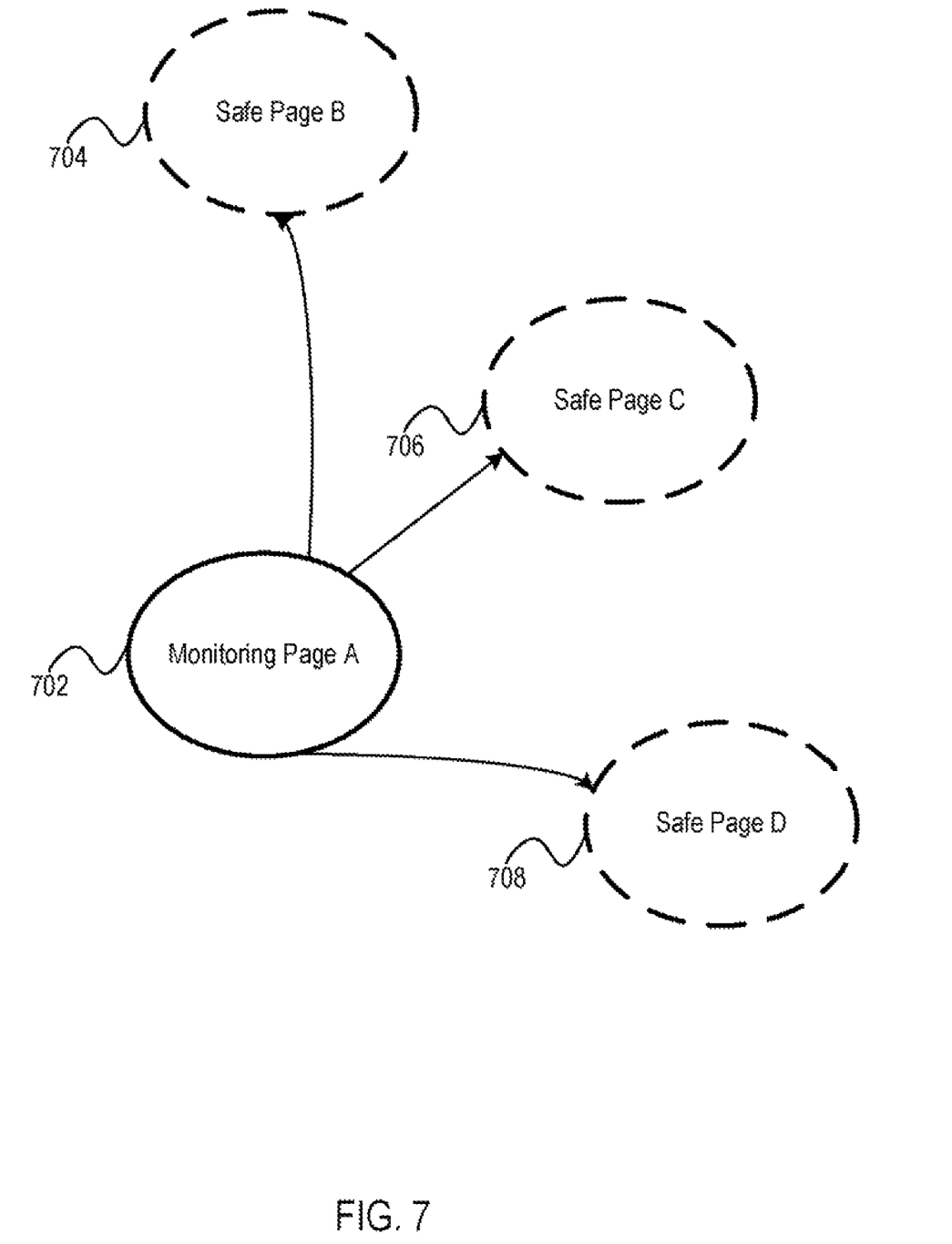
FIG. 7 shows, in an embodiment of the invention, a simple block diagram illustrating how a web monitor module may handle a family of web pages in which all web pages associated with a monitoring web page have a safe status.

FIG. 7 shows, in an embodiment of the invention, a simple block diagram illustrating how a web monitor module may handle a family of web pages in which all web pages associated with a monitoring web page have a safe status. In an example, a monitoring page A 702 may include three links (web page B, web page C, and web page D). After the verification process all three web pages have been identified as safe (safe page B 704, safe page C 706, and safe page D 708). As a result, the three link web pages may not be added to the URL database. However, since monitoring page A 702 has been identified as a potential suspicious page, monitoring page A 702 may remain inside the URL database for future monitoring.

Figure 8:
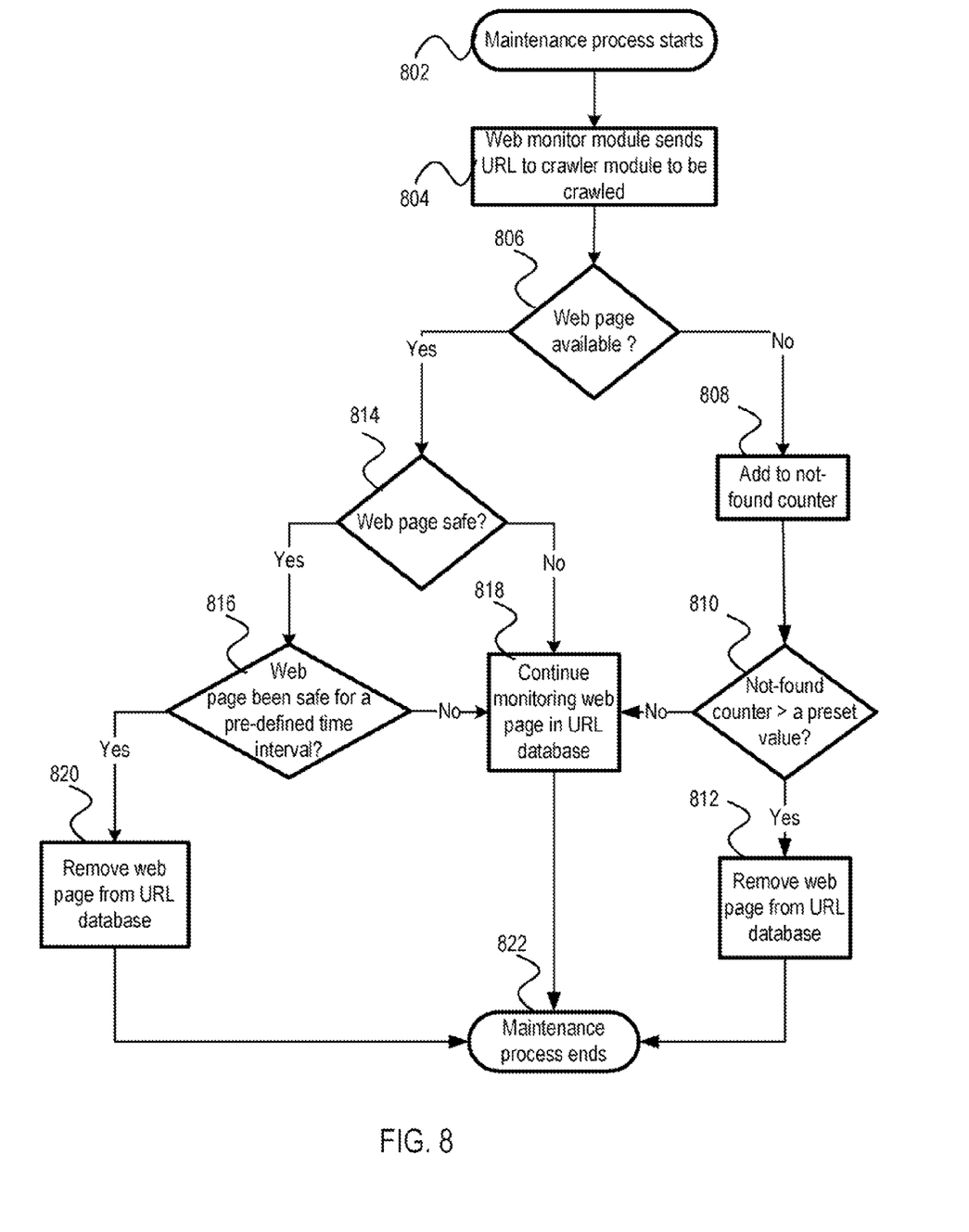
FIG. 8 shows, in an embodiment of the invention, a simple flowchart illustrating a URL database maintenance process.

As aforementioned, the URL database may grow as the web pages are added. FIG. 8 shows, in an embodiment of the invention, a simple flowchart illustrating a URL database maintenance process.

At a first step 802, the maintenance process begins. In an embodiment, the maintenance process may be performed as a separate process from the three aforementioned processes (e.g., monitoring process, downloading process, and verification process). In another embodiment, the maintenance process may be incorporated into the three aforementioned processes.

At a next step 804, the web monitor module may send a download request to crawler module to download a web page that is currently stored in the URL database. The crawler module may attempt to download the requested web page.

At a next step 806, the crawler module may check to see if the web page is downloadable.

If the crawler module is unable to download the web page, then at a next step 808, a not-found counter for the URL may be increased by one by the web monitor module. In an embodiment, the crawler module may make several attempts before reporting to the web monitor module that the web page is unavailable.

At a next step 810, the system may check to determine if the not-found counter is greater than a preset value.

In an example, a not-found counter may have to be greater than a preset value of 3, for example. If the not-found value is greater than the preset value, then at a next step 812, the URL may be removed from the URL database. Once the URL has been removed from the URL database, the maintenance process may end at is next step 822.

However, if at next step 810, the not-found counter is less than the preset value, then at a next step 818, the URL may continued to be monitored within the URL database and the maintenance process may end at next step 822.

If the crawler module is able to download the web page at step 806, then at a next step 814, the web page is sent to the MPI to determine the risk status. In an embodiment, the web page may not be sent to the MPI for analysis if the risk status is already identified by the MPI, especially if the MPI has not been changed or re-configured. In another embodiment, the web page may not be sent to the MPI for analysis if the web page has not been updated recently.

If the risk status of the web page is not safe, then at a next step 818, the web page is continued to be monitored within the URL database.

If the risk status of the web pages is safe, then at a next step 816, the web monitor module may check the history of the timestamps of the web page to determine if the web page has had a risk status of safe for a pre-defined time interval. In an example, a web page may have to have a continuous risk status of safe for three months before the web page may be removed from the URL database.

If the web page has not been safe for the required pre-defined time interval, then at next step 818, the web page is continued to be monitored within the URL database and the maintenance process may end at next step 822.

If the web page has been safe for the required pre-defined time interval, then at a next step 820, the web page is removed from the URL database and the maintenance process may end at step 822.

The steps shown in FIG. 8 illustrate a simple method for automating the maintenance process. By implementing the maintenance process, the automated process substantially eliminate human intervention and also enable the URL database to be kept current. Thus, the amount of disk space that may be required may be minimized. Further, the processing power that may be required to process a larger database may be reduced since the URL database has been trimmed to include only those web sites that may need to be monitored.

As can be appreciated from the forgoing, one or more embodiments of the present invention provide for active malicious web page discovery by employing an active malicious web page monitoring system. The monitoring, downloading, verifying, and maintaining processes have substantially remove the bottleneck that has been created in the prior art due to the limited resources that a company may have dedicated to the aforementioned task. Since the active malicious web page discovery process has been mostly automated, the volume of potential suspicious URLs and the related links that may be analyzed may drastically increased. Thus, with the embodiments of the inventions, the active malicious web page discovery process may be performed quickly, efficiently, and cost effectively.

While this invention has been described in terms of several preferred embodiments, there ale alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are man alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An arrangement for performing active malicious web page discovery, comprising:
   a web monitor module, said web monitor module being configured to monitor a plurality of potential suspicious unified resource locators (URLs);
   a crawler module, said crawler module being configured to download content associated with said plurality of potential suspicious URLs;
   a malicious page identifier (MPI), said MPI being configured to verify a set of risk statuses for said plurality of potential suspicious URLs; and
   a unified resource locator (URL) database, said URL database being configured to store at least said plurality of potential suspicious URLs, said URL database being maintained automatically to remove URLs, wherein at least an expired URL is removed from said URL database when said crawler module is unable to download web content associated with said expired URL.

2. The arrangement of claim 1 wherein at least a safe URL is removed from said URL database when said safe URL has a risk status of safe for more than a pre-defined time interval.

3. The arrangement of claim 1 wherein said web monitor module includes a monitor process component, wherein said monitor process component is configured
   to extract said plurality of potential suspicious URLs from said URL database at a pre-defined time interval,
   to identify a first set of URLs from said plurality of potential suspicious URLs,
   request said crawler module to download a first set of web pages associated with said first set of URLs,
   to receive said first set of web pages,
   to identify a second set of URLs from said first set of web pages,
   to request said crawler module to download a second set of webpages associated with said second set of URLs,
   to receive said second set of web pages,
   to analyze said second set of web pages to determine a third set of web pages, said third set of web pages including unverified web content, and
   to send said third set of web pages to said MPI for verification.

4. The arrangement of claim 3 wherein said crawler module is configured to include a page database, said page database being configured to store web pages downloaded by a set of spiders, said set of spiders is configured to access the internet to download said web pages if said web pages have not been stored in said page database or said web pages have been updated, said web pages being associated with said first set of URLs and said second set of URLs.

5. The arrangement of claim 4 wherein said MPI is configured to include
   a scan engine, said scan engine is configured to analyze said third set of web pages to identify a risk status for each web page of said third set of web pages, said risk status including safe, malicious, and suspicious, and
   an unknown threat detector, said unknown threat detector is configured to analyze a third web page of said third set of web page wherein said third web page including suspicious code.

6. The arrangement of claim 5 wherein said unknown threat detector is configured to analyze said third web page, said unknown threat detector employing a browser, said browser interacting with a proxy located within said crawler module by sending a request for said third web page to be downloaded, said proxy is configured to first check with said page database, if said third web page is not stored within said page database, said proxy is configured to send said request to said set of spiders to download said third web page from said internet.

7. The arrangement of claim 6 wherein said unknown threat detector is configured to determine a third risk status for said third web page by employing said browser to run said third web page to detect activities, said activities comprising writing to a registry, writing to memory, and downloading.

8. The arrangement of claim 7 wherein said monitor process component is configured to send an alert when said third risk status of said third web page is suspicious.

9. The arrangement of claim 1 wherein
   said expired URL is removed from said URL database when a not-found counter is greater than a preset value, said not-found counter being a counter configured to keep track of the number of times a web page associated with said expired URL is inaccessible.

10. A method for performing automatic active malicious web page discovery, comprising:
    identifying, using a web monitor module, potential suspicious URLs;
    downloading, employing a crawler module to access the internet, a first URL from said potential suspicious URLs;
    parsing, using said web monitor, said first web page to identify a second set of URLs to be sent to said crawler module for downloading; and
    verifying, using a malicious page identifier (MPI), a set of risk statuses of a third set of web pages, said third set of web pages being at least associated with one of said first URL and said second set of URLs.

11. The method of claim 10 wherein said web monitor module includes
    a unified resource locator (URL) database, said URL database being configured to store said potential suspicious URLs, and
    a monitor process component,
       wherein said monitor process component is configured to interact with said crawler module to identify said first URL and said second set of URLs to be sent to said crawler module for downloading,
       wherein said monitor process component is configured to interact with said MPI to identify said third set of web pages for verification, and
       wherein said monitor process component is configured to send an alert when a web page from said third set of web pages has a risk status of suspicious.

12. The method of claim 11 wherein said crawler module is configured to include a page database, said page database being configured to store web pages downloaded by a set of spiders, said set of spiders is configured to access said internet to download said web pages if said web pages have not been stored in said page database or said web pages have been updated, said web pages being associated with said first URLs and said second set of URLs.

13. The method of claim 12 wherein said MPI is configured to include
    a scan engine, said scan engine is configured to analyze said third set of web pages to identify a risk status for each of said third set of web pages, said risk status including safe, malicious, and suspicious, and an unknown threat detector, said unknown threat detector is configured to analyze a third web page of said third set of web page wherein said third web page including suspicious code.

14. The method of claim 13 wherein said unknown threat detector is configured to analyze said third web page, said unknown threat detector interacting, using a browser, with a proxy located within said crawler module by sending a request for said third web page to be downloaded, said proxy is configured to first check with said page database, if said third web page is not stored within said page database, said proxy is configured to send said request to said set of spiders to download said third web page from said internet, said proxy is configured to send said third web page back to said browser, said browser being configured to determine a third risk status for said third web page by running said third web page to detect activities, said activities comprising writing to a registry, writing to memory, and downloading.

15. The arrangement of claim 14 wherein a URL database is maintained automatically to remove URLs, including
   removing an expired URL from said URL database when said crawler module is unable to download web content of said expired URL and a not-found counter is greater than a preset value, said not-found counter being a counter configured to keep track of the number of time a web page is inaccessible and
   removing a safe URL from said URL database when said safe URL has a risk status of safe for more than a predefined time interval.

16. An article of manufacture comprising a program storage medium having computer readable code embodied therein, said computer readable code being configured for performing automatic active malicious web page discovery, comprising:
   code for identifying, using a web monitor module, potential suspicious URLs;
   code for downloading, using a crawler module to access the interne, a first URL from said potential suspicious URLs;
   code for parsing, employing said web monitor, said first web page to identify a second set of URLs to be sent to said crawler module for downloading; and
   code for verifying, using a malicious page identifier (MPI), a set of risk statuses of a third set of web pages, said third set of web pages being at least associated with one of said first URL and said second set of URLs.

17. The article of manufacture of claim 16 wherein said web monitor module includes
   a unified resource locator (URL) database, said URL database being configured to include code for storing said potential suspicious URLs, and
   a monitor process component,
      wherein said monitor process component is configured to include code for interacting with said crawler module to identify said first URL and said second set of URLs to be sent to said crawler module for downloading,
      wherein said monitor process component is configured to include code for interacting with said MPI to identify said third set of web pages for verification, and
      wherein said monitor process component is configured to include code for sending an alert when a web page from said third set of web pages has a risk status of suspicious.

18. The article of manufacture of claim 17 wherein said crawler module is configured to include a page database, said page database being configured to store web pages downloaded by a set of spiders, said set of spiders is configured to access said internet to download said web pages if said web pages have not been stored in said page database or said web pages have been updated, said web pages being associated with said first URLs and said second set of URLs.

19. The article of manufacture of claim 18 wherein said MPI is configured to include
   a scan engine, said scan engine is configured to include code for analyzing said third set of web pages to identify a risk status for each of said third set of web pages, said risk status including safe, malicious, and suspicious, and
   an unknown threat detector, said unknown threat detector is configured to include code for analyzing a third web page of said third set of web page wherein said third web page including suspicious code, said unknown threat detector is configured to include
      code for interacting, using a browser, with a proxy located within said crawler module by sending a request for said third web page to be downloaded, said proxy is configured to first check with said page database, if said third web page is not stored within said page database, said proxy is configured to include code for sending said request to said set of spiders to download said third web page from said internet and
      code for determining a third risk status for said third web page by running said third web page to detect activities, said activities comprising writing to a registry, writing to memory, and downloading.

20. The article of manufacture of claim 16 wherein a URL database is maintained automatically to remove URLs, including
   removing an expired URL from said URL database when said crawler module is unable to download web content of said expired URL and a not-found counter is greater than a preset value, said not-found counter being a counter configured to keep track of the number of time a web page is inaccessible, and
   removing a safe URL from said URL database when said safe URL has a risk status of safe for more than a predefined time interval.

\* \* \* \* \*